United States Patent
Noble

[11] Patent Number: 6,076,368
[45] Date of Patent: Jun. 20, 2000

[54] ELECTRICALLY OPERATED FLUID CONTROL DEVICE

[75] Inventor: Michael J Noble, St. Charles, Mo.

[73] Assignee: Emerson Electric Co., St. Louis, Mo.

[21] Appl. No.: 09/018,266

[22] Filed: Feb. 4, 1998

Related U.S. Application Data

[60] Provisional application No. 60/037,294, Feb. 5, 1997.

[51] Int. Cl.[7] .................................................. F25B 41/04
[52] U.S. Cl. .......................... 62/217; 62/225; 251/84; 251/129.11
[58] Field of Search ............... 62/225, 217; 251/129.11, 251/129.12, 129.13, 84, 85, 86

[56] References Cited

U.S. PATENT DOCUMENTS

| | | | |
|---|---|---|---|
| 3,967,781 | 7/1976 | Kunz | 236/68 |
| 4,067,203 | 1/1978 | Behr | 62/208 |
| 4,096,993 | 6/1978 | Behr | 236/68 |
| 4,171,087 | 10/1979 | Kunz | 236/68 |
| 4,237,924 | 12/1980 | Benjamin et al. | 137/510 |
| 4,239,177 | 12/1980 | Williams et al. | 251/11 |
| 4,268,006 | 5/1981 | Kunz et al. | 251/11 |
| 4,325,508 | 4/1982 | Kunz | 236/92 |
| 4,432,492 | 2/1984 | Kunz | 236/92 |
| 4,475,711 | 10/1984 | Rountry | 251/85 |
| 4,674,292 | 6/1987 | Ohya et al. | 62/223 |
| 4,723,754 | 2/1988 | Torimoto et al. | 251/129.05 |
| 4,787,213 | 11/1988 | Gras et al. | 62/212 |
| 4,848,652 | 7/1989 | Kennedy | 236/34.5 |
| 4,911,404 | 3/1990 | Dorste et al. | 251/129.08 |
| 4,928,494 | 5/1990 | Glamm | 62/222 |
| 4,969,628 | 11/1990 | Reich et al. | 251/122 |
| 4,986,085 | 1/1991 | Tischer | 62/225 |
| 5,000,009 | 3/1991 | Clanin | 62/115 |
| 5,052,656 | 10/1991 | Katayama | 251/129.11 |
| 5,085,248 | 2/1992 | Iwata et al. | 137/625.48 |
| 5,251,667 | 10/1993 | Kunz et al. | 137/607 |
| 5,259,416 | 11/1993 | Kunz et al. | 137/883 |
| 5,364,066 | 11/1994 | Dorste et al. | 251/122 |
| 5,370,354 | 12/1994 | Kunz | 250/30.02 |
| 5,392,612 | 2/1995 | Alsenz | 62/115 |
| 5,417,083 | 5/1995 | Eber | 65/528 |
| 5,501,201 | 3/1996 | Miyoshi et al. | 123/571 |
| 5,738,333 | 4/1998 | Cognevich et al. | 251/61.2 |
| 5,791,630 | 8/1998 | Nakao et al. | 251/129.19 |

*Primary Examiner*—Henry Bennett
*Assistant Examiner*—Marc Norman
*Attorney, Agent, or Firm*—Arnold White & Durkee

[57] ABSTRACT

A device for use in regulating the flow of a working fluid, such as a refrigerant, includes a body defining an axial opening, and a piston received within the axial opening. The piston is moveable in the body and has first and second ends. An actuator, which in one embodiment, is a stepper motor, is coupled to the first end of the piston for providing a force to the piston. An inlet and an outlet are coupled to the body such that the input, the output and the body define a passageway for the working fluid. An articulating seat assembly is coupled to the second end of the piston.

32 Claims, 4 Drawing Sheets

ELECTRICALLY OPERATED FLUID CONTROL DEVICE

CROSS-REFERENCE TO RELATED APPLICATION

This application claims the benefit of U.S. Provisional Application Ser. No. 60/037,294, filed on Feb. 5, 1997.

BACKGROUND OF THE INVENTION

1. Field of the Invention

This invention relates to heating, venting and air conditioning (HVAC) and refrigeration systems, and more particularly, to a device for controlling the flow of fluids in HVAC and refrigeration systems.

2. Description of Related Art

This invention relates to HVAC and refrigeration systems, and in particular to a device for maximizing the efficiency of working fluids in a refrigeration system. While the invention is described in detail with respect to a conventional refrigeration or HVAC system, those skilled in the art will recognize the wider applicability of the invention disclosed hereinafter. The invention may find application, with other refrigeration systems where system efficiency may be improved by monitoring specific parameters affecting that efficiency.

The operational features of conventional refrigeration systems are well known in the art. An example of such a system is a refrigerated container, such as a supermarket display case. In general, the refrigeration system would include a compressor that forces the particular refrigerant used in the system through a condensing coil, where the refrigerant vapor liquefies. The liquid refrigerant passes through a thermostatic expansion valve, expanding the high pressure liquid refrigerant to a low pressure vapor. The low pressure, low temperature refrigerant discharged from the thermostatic expansion valve is then directed through an evaporator coil for absorbing heat and thus refrigerating the space inside the container surrounding the evaporator coil.

The thermostatic expansion valve meters the flow of refrigerant into the evaporator coil in proportion to the rate of evaporation of the refrigerant in the evaporator coil, and is responsive to the temperature and pressure of the refrigerant leaving the evaporator coil. In this manner, the thermostatic expansion valve can control the refrigerant leaving the evaporator coil at a predetermined superheat. Generally, the superheat of the refrigerant is a measure of the heat contained in the refrigerant vapor above its heat content at the boiling point (saturated vapor temperature) at the existing pressure. Maintaining the refrigerant entering the suction line from the evaporator coil at a desired superheat level enhances the refrigeration system performance.

Thermal expansion valves, however, control only to a specific refrigerant superheat. Any changes in the system resulting in a change in evaporator coil pressure also cause a corresponding change in the display case temperature—even with the same superheat. In order to provide more consistent case temperature, a suction regulator may be used to maintain a consistent evaporator coil pressure. In known systems, conventionally designed mechanical pressure regulators are used for this purpose. Conventional mechanical pressure regulators include a throttling element that, when moved, limits the flow of the refrigerant through the suction regulator to regulate the pressure. A diaphragm, or other sensing element, responds to variations in the inlet pressure and moves the throttling element accordingly. A reference pressure, typically exerted by a spring, is applied to one side of the diaphragm to bias the diaphragm in a desired position, or set point. High side inlet pressure is applied to the other side of the diaphragm to move the diaphragm against the spring, and thus, move the throttling element.

Adjusting the set point requires a time consuming, manual process. Once the regulator's bias spring is adjusted for the proper set point, case temperature control can be expected to be plus or minus about 4° F. In many refrigeration system implementations, finer temperature control is desirable. With the example grocery store case refrigeration system, several factors fuel the need for finer case temperature control. Government regulations may require more stringent temperature regulation, and requirements for longer product shelf life and improved product quality further make tighter control of case temperature a necessity. Moreover, if the refrigerant or desired temperature changes, the complicated process of manually adjusting the pressure regulator's set screw must be repeated.

The present invention addresses these, and other, shortcomings associated with the prior art.

SUMMARY OF THE INVENTION

In one aspect of the invention, a device for use in regulating the flow of a working fluid includes a body defining an axial opening with a piston received within the body opening. The piston is moveable in the body and it has first and second ends. An actuator is coupled to the first end of the piston for providing a force to the piston, and an inlet and an outlet are coupled to the body such that the input, the output and the body define a passageway for the working fluid. An articulating seat assembly is coupled to the second end of the piston.

In another aspect of the invention, a suction regulating device for use in regulating the flow of a working fluid includes a body defining an axial opening with a piston received within the body opening. The piston is moveable in the body and is has first and second ends. An electric stepper motor having a pinion shaft is coupled to the first end of the piston for providing a force to the piston. An inlet and an outlet are coupled to the body such that the input, the output and the body define a passageway for the working fluid.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
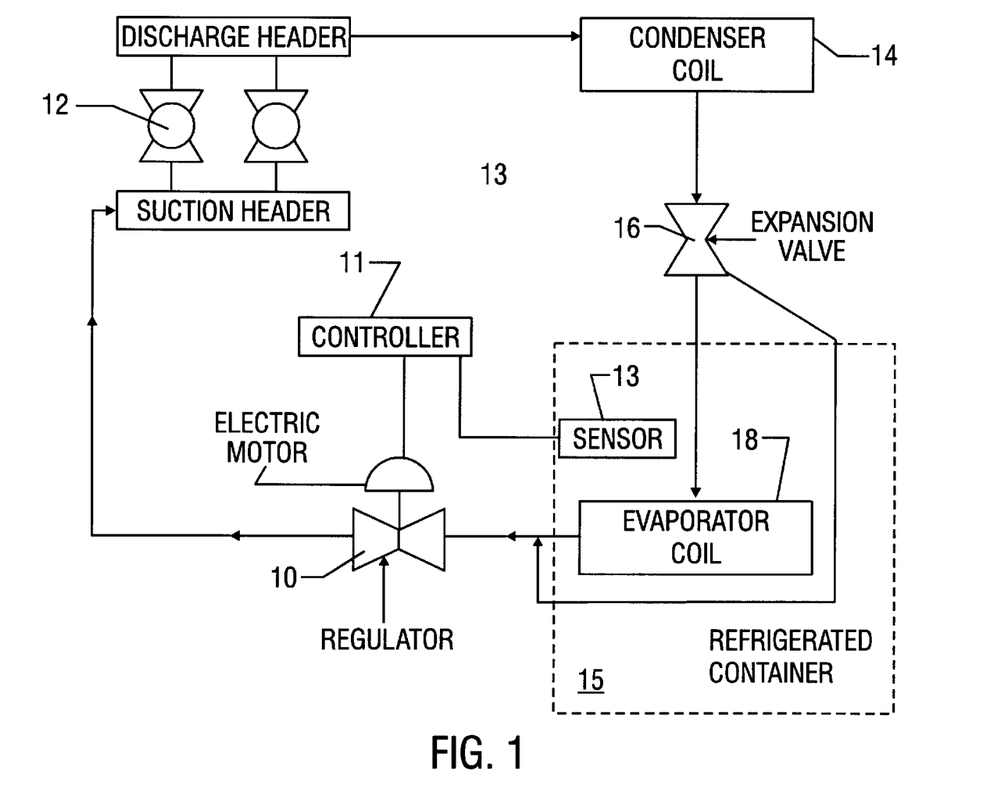
FIG. 1 is a schematic drawing of a typical refrigeration system including a fluid control device in accordance with an embodiment of the present invention.

FIG. 1 illustrates a typical refrigeration system employing a fluid control device, generally designated 10, in accordance with an embodiment of the current invention. A system as illustrated in FIG. 1 may be used, for example, to refrigerate a container 15 such as a grocery display case containing meat, frozen vegetables, etc. A compressor 12 provides the motive force for the fluid circulated within the system, the direction of flow being indicated by arrows on the lines between the illustrated components. More particularly, the compressor 12 forces the working fluid through a condenser coil 14, an expansion valve 16, and an evaporator coil 18 in a manner well known in the art. The fluid control device 10 controls fluid flow between the evaporator coil 18 and the suction side of the compressor 12 in a manner described more fully below. A controller 11 controls actuation of the fluid control device in response to a signal received from a sensor 13, which may be located within the refrigerated space or container 15. As noted above, the invention is widely applicable in a variety of fluid control situations and, although denominated a suction regulator valve in FIG. 1, the invention is not so limited.

Figure 2:
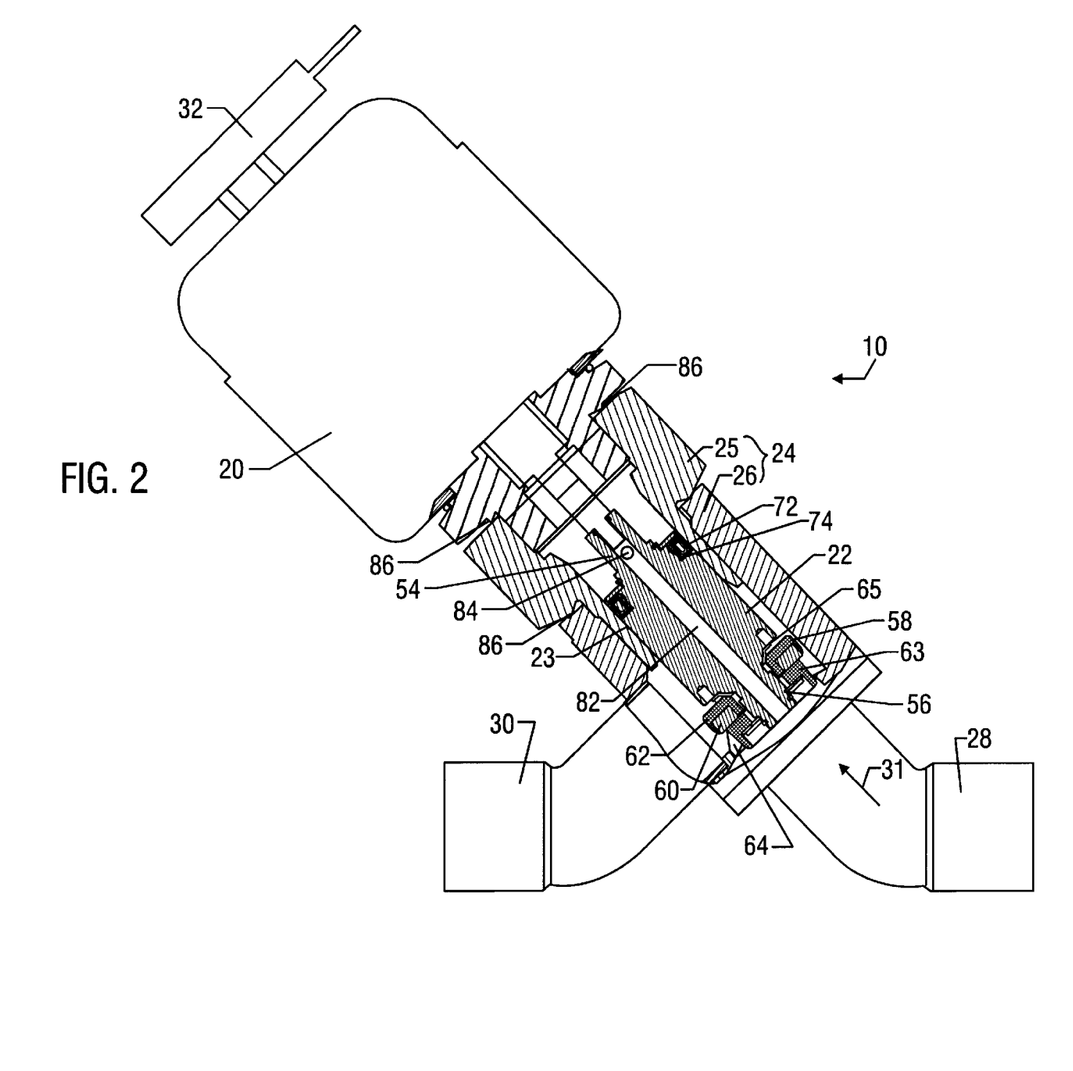
FIG. 2 is an elevation view, partially in section, of an embodiment of a flow control device in accordance with the present invention.

FIG. 2 illustrates the fluid control device 10 in greater detail. The fluid control device 10 generally comprises a motor assembly 20 and a body 24 that defines an axial opening 23 adapted to receive a piston 22, such that the piston 22 is linearly moveable, bi-directionally, in the body 24. The body 24 in the embodiment of FIG. 2 includes a bell 25 and a tube portion 26. The motor assembly 20 of the fluid control device 10 is powered by electricity received via an electrical connector 32 which may be of any type commonly known in the art to be suitable for this purpose. Suitable connectors are commercially available from well known suppliers such as AMP and Deutsch.

Fluid flows from and to the fluid control device 10 via an inlet 28 and an outlet 30, respectively. An arrow 31 indicates the direction of fluid flow through the device 10. Configuring the inlet 28 such that fluid enters the device 10 from the bottom, as shown in FIG. 2, minimizes pressure losses. In the embodiment of FIG. 2, the inlet 28 and the outlet 30 are an inlet tube and an outflow tube that, together with the body 24, form a passageway for fluid flow. The inlet 28 and the outlet 30 may in some embodiments be considered a part of the body 24. The tube body 26 of the body 24 is sealably connected to the inlet 28 and the outlet 30 in any suitable manner known to the art. Typically, the tube body 26 may be joined to the inlet tube 28 and the outlet tube 30 by either sweating or soldering the connections. The seal is important to prevent the fluid from leaking out of the system as will be apparent to those in the art having the benefit of this disclosure.

Figure 3:
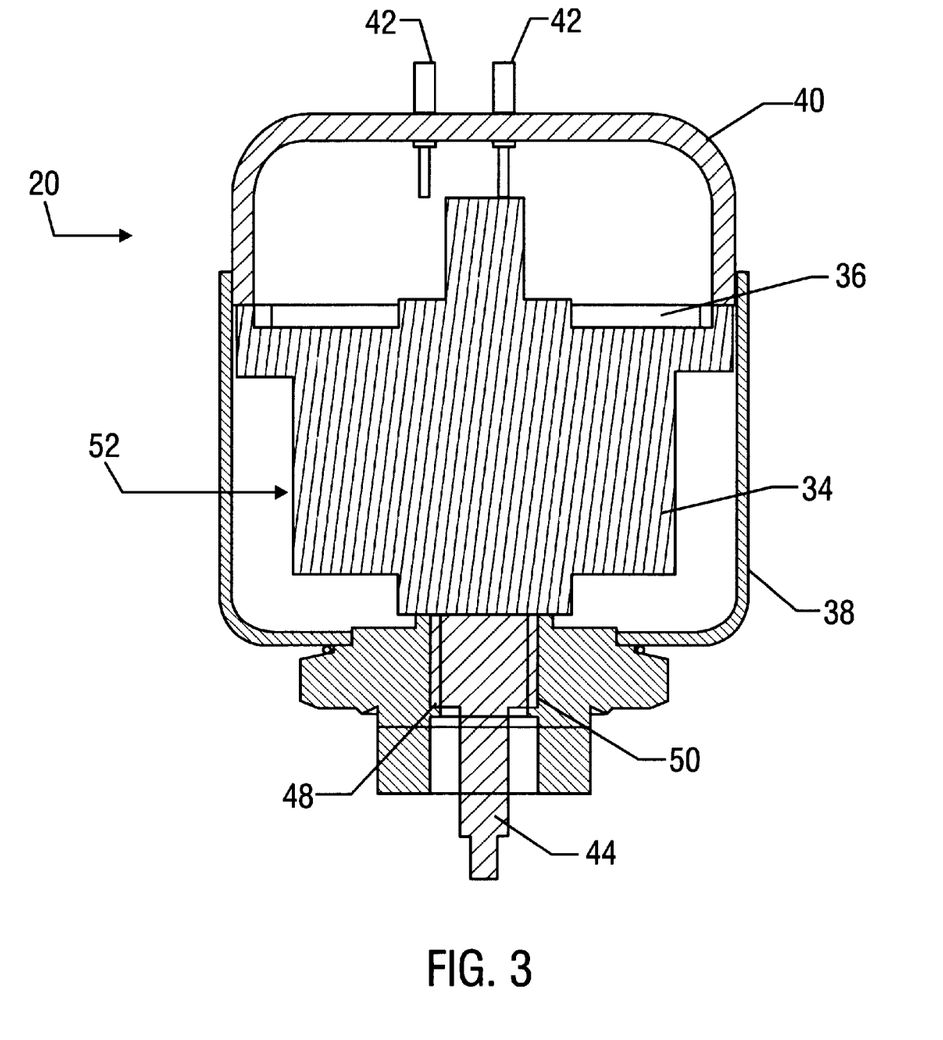
FIG. 3 is a cross-sectional view of the motor assembly of the device illustrated in FIG. 2.

Referring now to FIG. 3, the motor assembly 20 of the fluid control device 10 is illustrated in greater detail. The motor assembly 20 generally comprises a motor 34 mounted to a weld spacer 36 that is affixed to a motor housing 38. The housing 38 is closed by a top cap assembly 40, which includes electrically conductive pins 42 through which power received via the electrical connector 32 is supplied to the motor 34 as shown in FIG. 2. Returning to FIG. 3, the motor 34 drives a pinion shaft 44 that, although not shown, is threaded. The pinion shaft 44 extends through an opening 48 of a nut 50 threadably connected to the bottom of the housing 38. The motor 34 and pinion shaft 44 in the specific embodiment illustrated comprise an actuator 52 for providing a linear force to the piston 22 in a manner described more fully hereafter.

In one particular embodiment, the motor 34 is a linear actuating bipolar stepper motor. The stepper motor moves the piston in discrete increments to modulate the flow of refrigerant as required to control temperature. A stepper motor is used in this embodiment because, among other things, it provides discrete control, and requires only minimal electrical power when moving the piston and no electrical power when holding the piston in a static position. Suitable stepper motors are readily commercially available. In one embodiment of the invention, the particular stepper motor used travels 0.001 inch per linear step, and is designed to operate within the full temperature range anticipated for the stated application. It is compatible with all common types of refrigerants and oils. The motor used is a two-phase bi-polar stepper motor operating on 12 or 24 volts DC nominal bipolar driver voltage at a rate of 50 pulses per second.

A bipolar stepper motor is preferred over a unipolar stepper motor due to its greater efficiency. Further, the stepper motor used in this embodiment includes a direct-drive design, in that the stepper motor's rotor assembly (not shown) is directly coupled to the pinion shaft 44, which is directly coupled to the piston 22. Thus, there are no gears or other mechanical means used to multiply the motor's torque. Using a direct-drive stepper motor, rather than a gear-reduced motor, eliminates these additional components, simplifying the assembly process. Moreover, using a direct-drive stepper motor eliminates the complexity and reliability problems associated with gear-reduced motor designs, including hysteresis, gear lash, etc.

Figure 4:
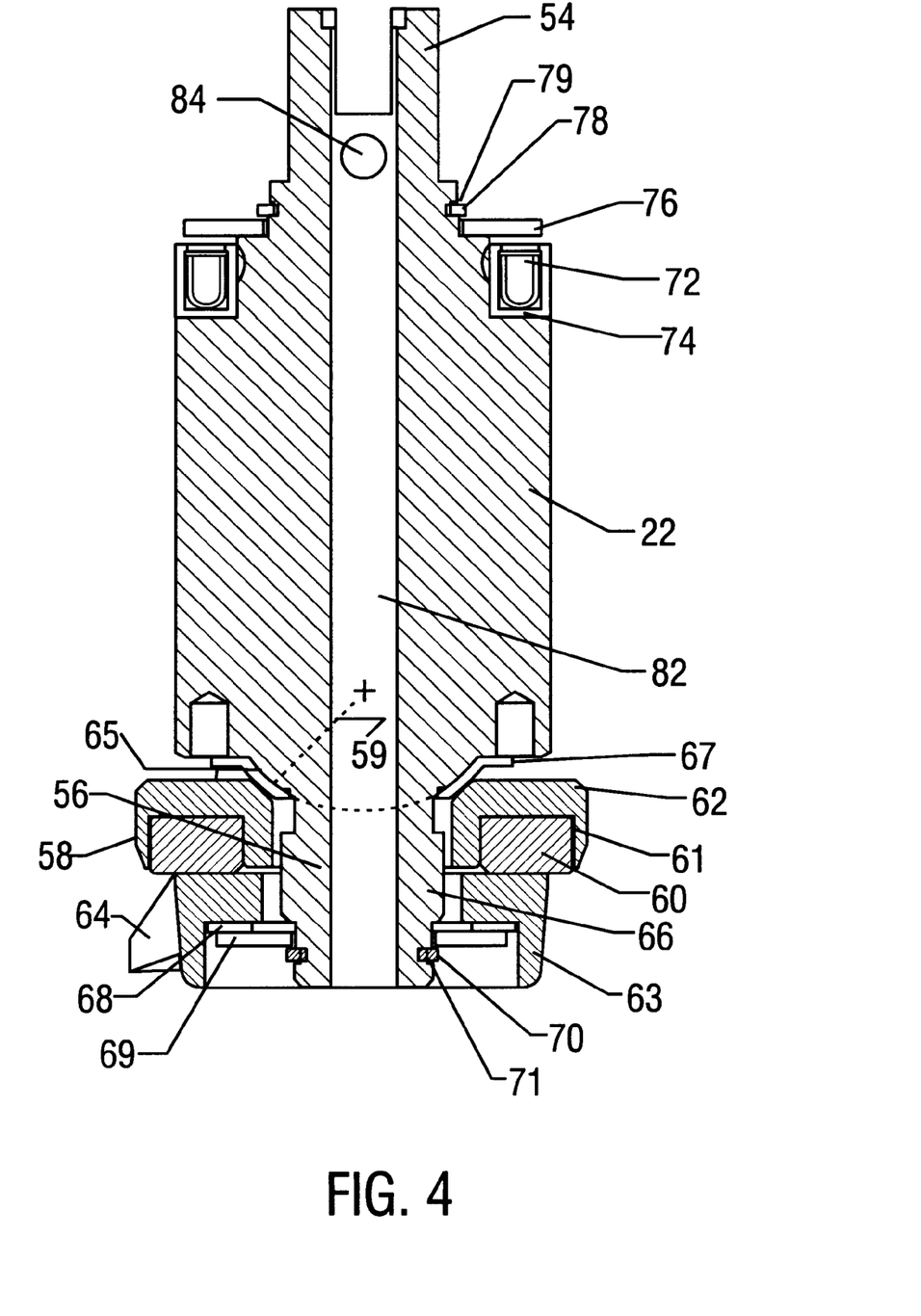
FIG. 4 is a cross-sectional view of the piston illustrated in the embodiment of FIG. 2.

Turning now to FIG. 4, the piston 22 is illustrated in greater detail in a cross-sectional view. The piston 22 includes a first end 54 that is adapted to be coupled to the pinion shaft 44. In the exemplary embodiment illustrated, the piston first end 54 is threaded to receive the threaded pinion shaft 44 to directly couple the actuator output to the piston 22. The piston 22 further includes a second end 56 that has a seat assembly 58 coupled thereto. The seat assembly 58 includes a seat disc 60, which is received in an annular channel 61 defined by a seat disc carrier 62. A flow characterizer 63 may further be coupled to the seat disc 60.

The device 10 may be required to completely stop fluid flow from the inlet 28 to the outlet, for example, when defrosting a refrigerated grocery case. To provide a tight shut-off, the seat disc 60 must mate properly with a valve seat 64 defined by the body 24. Achieving a tight shut-off and preventing internal leaks would require extremely stringent dimensional tolerances and assembly processes on many of the components involved in creating the shut-off seal, in turn, increasing the cost of the device. To improve producability, the seat assembly 58 is configured such that it articulates about the piston second end 56 to compensate for production variation.

In the exemplary piston 22 illustrated in FIG. 4, the piston second end 56 defines a rounded shoulder 65 having a spherical radius (shown in phantom lines and designated by reference 59) that tapers to a generally cylindrical portion 66. The cylindrical portion 66 defines a diameter that is smaller than the inside diameter of the seat disc carrier 62. The seat disc 62 abuts the rounded shoulder 64 such that a seal is formed. A washer 67 may be placed about the shoulder 65, so that the seat disc 62 actually seals against the washer 67. A spring washer 68 and a washer 69, respectively, are placed about the piston cylindrical portion 66, with the wave washer 69 seating against the characterizer 63, opposite the seat disc 60. A retaining ring 70 is received in an annular groove 71 defined by the cylindrical portion 66 to secure the seat assembly 58 about the piston second end 56. Securing the seat assembly 58 in this fashion allows the seat assembly 58 to articulate about the cylindrical portion 66 of the piston second end 56. This "ball-and-socket" movement is facilitated by the spherical radius 59 of the rounded shoulder 65, allowing the carrier 62 to maintain a seal against the piston 22 when the seat assembly 58 is moved about the second end 56.

Moreover, the characterizer 63 defines an inside diameter larger than the cylindrical portion 66. This, along with securing the seat assembly 58 via the spring washer 68, the washer 69, and the retaining ring 70, allows the characterizer 63 to slide laterally—or side-to-side—to align itself with the valve body seat 64. This further relaxes the dimensional precision required, and compensates for production variations.

The piston 22 also includes a sliding seal 72 that, in one embodiment of the invention, is spring loaded. The sliding seal 72 may be constructed of an elastomeric or thermoplastic material as is readily known in the art, and is held in place on a shoulder 74 by a washer 76 and a retaining ring 78 in a groove 79. The sliding seal 72 forms a lip seal against the opening 23 of the body 24 as the piston 22 reciprocates therein as set forth more fully below.

To reduce the output force required for the motor 20 to move the piston 22, the pressure above and below the piston 22 is balanced. The bottom of the motor housing 38, the inside wall of the axial bore 23 of the body 24, and the shoulder 74 define a chamber 80. The piston 22 defines a longitudinal aperture 82 and a cross aperture 84 connected to the longitudinal aperture 82. The apertures 82, 84 provide a fluid path from the inlet 28 to the chamber 80, to equalize the pressure on the piston first end 54 and second end 56.

It is important that the fluid control device 10 be properly sealed to prevent undesirable fluid flow from the inlet tube 28 to the outflow tube 30 and from the fluid control device 10 generally to the surrounding environment. In addition to the sliding seal 72 of the piston 22, several other sealed connections combine to accomplish this task. More particularly, the motor housing 38 and the top cap assembly 40 of the motor assembly 20 shown in FIG. 3 are hermetically sealed in the specific embodiment illustrated therein. Further, threaded connections between the motor housing 38 and the bell 25, and the bell 25 and the tube portion 26 of the body 24 (best shown in FIG. 2) are sealed by operation of knife-seals 86 in a manner well known to the art. This metal-to-metal seal design eliminates the need for external sealing o-rings, and in turn, eliminates the failures associated with o-rings. The connection between the electrical connector 32 and the motor assembly 20 is sealed by applying silicone RTV, silicone dielectric gel, or other similar sealing media around the periphery of the electrical connector 32 where it contacts the surface of the motor assembly 20.

Referring to FIG. 1, actuation of the fluid control device 10 is controlled through appropriate power regulation by means of a sensor 13, such as a thermistor or other temperature sensing device, in conjunction with a controller 11 associated with a suitable control software algorithm, as is well known in the art. Referring once again to FIG. 2, the actuator 52 moves the piston 22 linearly and bi-directionally within the axial opening 23 in a stepwise fashion to open and close the fluid control device 10. The linear, bi-directional, stepwise motion of piston 22 enables greater control over fluid flow and, hence, greater precision in system operations in a manner previously unknown to the art.

Prior art suction valves use a mechanical pressure regulator as described in the Background of the Invention section herein. Thus, with known suction valves, evaporator pressure is controlled to indirectly maintain the temperature of the evaporator coil, and in turn, the temperature in the refrigerated environment, based on the specific refrigerant's pressure-temperature relationship. In the embodiment of the invention illustrated herein, the actuator 52 comprises a stepper motor 20, which is controlled to actuate the piston 22 in response to variations in temperature or other parameters within the environment being cooled. Therefore, changes in system parameters, such as changing refrigerant, do not affect temperature control.

For example, in a refrigerated grocery case implementation, thermisters or other temperature sensors may be situated to measure the system discharge air or return air. Alternatively, sensors may be placed directly in the grocery case, among the products contained therein. Thus, the flow of refrigerant in the system is controlled according to the temperature of the grocery case. Moreover, in a system employing a device 10 in accordance with the present invention, system performance may be monitored remotely and changes in system set point may be accomplished remotely using, for example, a personal computer with a modem connection.

It will be appreciated by those of ordinary skill in the art having the benefit of this disclosure that the embodiment illustrated above is capable of numerous variations without departing from the scope and spirit of the invention. For example, undesirable fluid flow may be sealed in any suitable manner known to the art and the invention claimed below is not limited to the sealing mechanisms of the specific embodiment set forth above. It is fully intended that the invention for which a patent is sought encompasses within its scope all such variations without being limited to the specific embodiment disclosed above. Accordingly, the exclusive rights sought to be patented are as described in the claims below.

What is claimed is:

1. A device for use in regulating the flow of a working fluid comprising:

a body defining an axial opening;

a piston received within the axial opening, the piston being moveable in the body and having first and second ends, the second end having a rounded shoulder tapering to a generally cylindrical portion that defines a diameter;

an actuator coupled to the first end of the piston for providing a force to the piston;

an inlet and an outlet coupled to the body such that the inlet, the outlet and the body define a passageway for the working fluid; and an articulating seat assembly coupled to the second end of the piston, the articulating seat assembly including a seat disc and a carrier adapted to receive the seat disc, the carrier defining an inside diameter larger than the cylindrical portion diameter, wherein the carrier surrounds the cylindrical portion and abuts the rounded shoulder in a sealing relationship.

2. The device of claim 1 wherein the actuator comprises a stepper motor.

3. The device of claim 2 wherein the actuator includes a pinion shaft coupled to the piston first end.

4. The device of claim 3 wherein the stepper motor includes a rotor that directly drives the pinion shaft.

5. The device of claim 3 wherein the pinion shaft is threaded and wherein the threaded pinion shaft is threadably received by the first end of the piston.

6. The device of claim 1 wherein the piston is linearly moveable bi-directionally.

7. The device of claim 1 wherein the piston defines a longitudinal aperture.

8. The device of claim 7 wherein the piston further defines a cross-aperture connected to the longitudinal aperture.

9. The device of claim 1 further including a sliding sealing member between the piston and the body.

10. The device of claim 1 wherein the rounded shoulder defines a spherical radius.

11. The device of claim 1 further comprising a flow characterizer coupled to the seat disc.

12. The suction regulating device of claim 11 wherein the characterizer is moveable laterally.

13. The device of claim 1 further including a washer situated between the shoulder and the carrier.

14. The device of claim 2 wherein said stepper motor is hermetically sealed in a motor housing.

15. A suction regulating device for use in regulating the flow of a working fluid comprising:
   a body defining an axial opening;
   a piston received within the axial opening, the piston being moveable in the body and having first and second ends;
   an electric stepper motor having a rotor assembly directly coupled to a pinion shaft, the pinion shaft being directly coupled to the first end of the piston for providing a force to the piston; and
   an inlet and an outlet coupled to the body such that the inlet, the outlet and the body define a passageway for the working fluid.

16. The suction regulating device of claim 15 wherein the electric stepper motor comprises a bipolar stepper motor.

17. The suction regulating device of claim 15 wherein the pinion shaft is threaded and wherein the threaded pinion shaft is threadably received by the first end of the piston.

18. The suction regulating device of claim 15 further comprising an articulating seat assembly coupled to the second end of the piston.

19. The suction regulating device of claim 18 wherein the second end of the piston defines a rounded shoulder tapering to a generally cylindrical portion that defines a diameter, and wherein the articulating seat assembly comprises:
   a seat disc; and
   a carrier adapted to receive the seat disc, the carrier defining an inside diameter larger than the cylindrical portion diameter, the carrier surrounding the cylindrical portion and abutting the rounded shoulder in a sealing relationship.

20. The suction regulating device of claim 19 wherein the rounded shoulder defines a spherical radius.

21. The suction regulating device of claim 19 further comprising a flow characterizer coupled to the seat disc.

22. The suction regulating device of claim 21 wherein the characterizer is moveable laterally.

23. The suction regulating device of claim 15 further comprising a sliding sealing member forming a seal between the piston and the body.

24. The suction regulating device of claim 15 wherein the piston defines a longitudinal aperture.

25. The suction regulating device of claim 24 wherein the piston further defines a cross aperture connected to the longitudinal aperture.

26. The suction regulating device of claim 25 wherein the stepper motor is hermetically sealed in a motor housing, and wherein the motor housing is coupled to the body in a sealed fashion.

27. The suction regulating device of claim 26 wherein:
   the first end of the piston defines a shoulder and a generally cylindrical portion;
   the generally cylindrical portion defines a diameter that is smaller than an inside diameter defined by the body axial opening, such that the motor housing, the body, the shoulder, and the generally cylindrical portion define an annular chamber; and
   the longitudinal and cross apertures provide a passageway for the working fluid from the inlet to the annular chamber to equalize the pressure on the first and second ends of the piston.

28. The suction regulating device of claim 15 wherein said working fluid is a refrigerant.

29. A suction regulating device for use in regulating the flow of a working fluid comprising:
   a body defining a flow passage;
   a piston positioned within the body for restricting the flow of the working fluid through the flow passage, the piston including first means for balancing pressure above and below the piston; and
   second means for actuating the piston.

30. A suction regulating device for use in regulating the flow of a working fluid comprising:
   a body defining an axial opening;
   a piston received within the axial opening, the piston being moveable in the body and having first and second ends;
   a sliding sealing member forming a seal between the piston and the body;
   an electric stepper motor having a pinion shaft coupled to the first end of the piston for providing a force to the piston; and
   an inlet and an outlet coupled to the body such that the inlet, the outlet and the body define a passageway for the working fluid.

31. A suction regulating device for use in regulating the flow of a working fluid comprising:
   a body defining an axial opening;
   a piston having first and second ends moveably received within the axial opening, the piston defining a longitudinal aperture and a cross aperture connected to the longitudinal aperture;
   an electric stepper motor having a pinion shaft coupled to the first end of the piston for providing a force to the piston, wherein the stepper motor is hermetically sealed in a motor housing and wherein the motor housing is coupled to the body in a sealed fashion; and
   an inlet and an outlet coupled to the body such that the inlet, the outlet and the body define a passageway for the working fluid.

32. A suction regulating device for use in regulating the flow of a working fluid comprising:
   a body defining an axial opening;

a piston moveably received within the axial opening, the piston defining a longitudinal aperture and a cross aperture connected to the longitudinal aperture;

the piston including a first end defining a shoulder and a generally cylindrical portion, wherein the generally cylindrical portion defines a diameter that is smaller than an inside diameter defined by the body axial opening, such that the motor housing, the body, the shoulder, and the generally cylindrical portion define an annular chamber;

an electric stepper motor having a pinion shaft coupled to the first end of the piston for providing a force to the piston; and an inlet and an outlet coupled to the body such that the inlet, the outlet and the body define a passageway for the working fluid, wherin the longitudinal and cross apertures provide a passageway for the working fluid from the inlet to the annular chamber to equalize the pressure on the first and second ends of the piston.

* * * * *

UNITED STATES PATENT AND TRADEMARK OFFICE
CERTIFICATE OF CORRECTION

PATENT NO. : 6,076,368
DATED : June 20, 2000
INVENTOR(S) : Michael J. Noble and Daniel Michaelis It is certified that error appears in the above-identified patent and that said Letters Patent is hereby corrected as shown below:

Title page item

[75] Inventor: Please insert --Daniel Michaelis, Cordova, TN--

Signed and Sealed this

Twenty-fourth Day of April, 2001

Attest:

NICHOLAS P. GODICI

Attesting Officer     Acting Director of the United States Patent and Trademark Office